US006702870B2

(12) United States Patent
Hultman et al.

(10) Patent No.: US 6,702,870 B2
(45) Date of Patent: Mar. 9, 2004

(54) METHOD FOR PREPARATION OF IRON-BASED POWDER AND IRON-BASED POWDER

(75) Inventors: Lars Hultman, Viken (SE); Nils Jonsson, Ängelholm (SE); Britt Benemark, Viken (SE); Peter Grahn, deceased, late of Höganäs (SE), by Svante Grahn, legal representative

(73) Assignee: Höganäs AB, Höganäs (SE)

( * ) Notice: Subject to any disclaimer, the term of this patent is extended or adjusted under 35 U.S.C. 154(b) by 0 days.

(21) Appl. No.: 10/203,820

(22) PCT Filed: Mar. 9, 2001

(86) PCT No.: PCT/SE01/00506
§ 371 (c)(1),
(2), (4) Date: Nov. 25, 2002

(87) PCT Pub. No.: WO01/67182
PCT Pub. Date: Sep. 13, 2001

(65) Prior Publication Data
US 2003/0177867 A1 Sep. 25, 2003

(30) Foreign Application Priority Data
Mar. 10, 2000 (SE) .............................................. 0000817
Mar. 10, 2000 (SE) .............................................. 0000818

(51) Int. Cl.$^7$ .............................. B22F 1/00; C22C 1/05
(52) U.S. Cl. .............................. 75/252; 75/349; 75/363
(58) Field of Search .............................. 419/31; 75/252, 75/349, 363

(56) References Cited

U.S. PATENT DOCUMENTS

| 4,799,955 A | * | 1/1989 | McClellan .................. 428/570 |
| 5,538,656 A | | 7/1996 | Mano et al. |
| 5,759,435 A | * | 6/1998 | Miyazono et al. ....... 252/62.59 |
| 5,866,273 A | * | 2/1999 | Wiggins et al. ............. 428/611 |
| 6,309,620 B1 | * | 10/2001 | Schlegel et al. ............ 423/326 |
| 6,537,389 B1 | * | 3/2003 | Aichele et al. ............. 148/307 |

FOREIGN PATENT DOCUMENTS

| EP | 0 086 445 | 8/1983 |
| JP | 61219959 | 2/1987 |
| JP | 63184764 | 12/1988 |

* cited by examiner

*Primary Examiner*—Ngoclan Mai
(74) *Attorney, Agent, or Firm*—Burns, Doane, Swecker & Mathis, L.L.P.

(57) ABSTRACT

The invention concerns a process permitting the preparation of a new powder, which as such or further processed is useful within a wide variety of different fields and which has magnetic and electric properties. The powder includes at least 0.5% by weight of iron containing silicate and at least 10% by weight of metallic iron and/or alloyed iron and is prepared by a process comprising the steps of mixing an iron containing powder and a silicon containing powder; and reducing the obtained mixture at a temperature above about 450° C.

35 Claims, No Drawings

METHOD FOR PREPARATION OF IRON-BASED POWDER AND IRON-BASED POWDER

FIELD OF THE INVENTION

This invention relates to a new iron-based powder material and a process for the preparation thereof. Particularly the invention concerns a process permitting the preparation of a new powder, which as such or further processed is useful within a wide variety of different fields and which has magnetic and electric properties.

BACKGROUND OF THE INVENTION

Iron-based powders having magnetic and electric properties are used for many different purposes and within a wide variety of industrial fields. An example of such a field is electrophotograpy wherein iron-based powders may be used as carrier cores or as magnetic pigments in toners. Another field is magnetic core components where iron-based powders are compacted to obtain a specific component useful in e.g. electric circuits. Very fine (small particle) iron-based powders made by e.g. the carbonyl process are also used in magnetic core components, electromagnetic interference/shielding, for parts made by metal injection moulding and in magnetic fluids.

The present invention concerns a new powder which as such or when further processed is potentially useful for all these materials as well as for other applications where specific magnetic and/or electric properties are required. The powder may also be used in such fields where magnetic and/or electric properties are not necessary, e.g. within the food or pharmaceutical industries A method of preparing an iron-based powder suitable for use within these technical fields is disclosed in the U.S. Pat. No. 5,538,656. More particularly, this patent concerns a magnetic oxide, which is produced by mixing a magnetisation control material (Ca, Ti, Sn, Si, Mg) with hematite and/or magnetite and sintering the obtained mixture in an inert gas at 550° C. to 1500° C. The desired magnetic oxide, which according to this patent can be easily mass-produced, is single phase magnetite ($Fe_3O_4$). Furthermore, the patent discloses that if the reaction parameters are not accurately selected other magnetic oxides, such as wustite (FeO) and hematite ($Fe_2O_3$) may be obtained as undesired impurities. The magnetic oxide prepared according to this patent has saturation magnetisation values varying between about 90 (when no addition of magnetisation control agent is made) to about 10 emu/g (when about 80% by weight magnetisation control agent is added).

The use of silica in iron-based powder is also disclosed in the Japanese patent publication 63-184764. Also this publication discloses the use of inert atmosphere and the obtained product mainly consists of magnetite and a non magnetic oxide. The purpose of the invention according to this publication is to reduce the saturation magnetisation to values lower than that of pure magnetite. About the same values of saturation magnetisation as in the US patent are obtained.

It has now been found that these values can be remarkably increased by performing the process in a reducing atmosphere in stead of an inert atmosphere. For comparable additions of magnetisation control agent it has thus unexpectedly been found that materials having magnetic saturation values ranging from 220 to 30 emu/g can be prepared.

Another publication which discloses silicon containing iron based powders is the Japanese patent publication 61-155595, which concerns a technology for the production of ferroalloy particles containing 0.1–5.0 atom-% silica. This process involves a reduction step of a silicate containing magnetite material. The powder obtained after the reduction had a magnetic saturation between 90 and 184 emu/g and remanence between 7 and 24 and coercivity between 80 and 205 Oe. Average particle sizes of less than 0.25 micron were obtained. A main purpose of the invention according to this publication is to prepare spherical particles for use as magnetic toners and carriers for electrostatic copying. A necessary feature of the invention according to this invention is a comparatively complicated precipitation process for the preparation of the silicate containing magnetite material, i.e. the starting material which is subjected to the reduction.

OBJECTS OF THE INVENTION

An object of the present invention is to provide a simple and economically attractive process which makes it possible to prepare an iron based powder having a very fine particle size.

A second object is to provide a process for the preparation of an iron-based powder material having magnetic and electric properties, which can be adapted to a wide variety of different needs.

A third object is to provide a process for the preparation of an iron-based powder having a saturation magnetisation, which may be varied within a broad interval with maintained good soft magnetic properties, such as low coercivity and remanence.

A forth object is to provide an iron-based powder the soft magnetic properties of which are uniquely good in relation to the particle size.

A fifth object is to provide a new material that is environmentally friendly.

SUMMARY OF THE INVENTION

The iron-based powder according to the invention includes at least 0.5% of iron containing silicate and at least 10% by weight of metallic iron and/or alloyed iron and is prepared by mixing an iron containing powder and a silicon containing powder and reducing the obtained mixture at a temperature above about 450° C.

The new material according to the present invention essentially consists of a compounded structure comprising mainly a mixture of iron, which is present in the form of metallic iron and/or alloyed iron, iron containing silicate and minor amounts of iron oxides The critical features of the new material according to the present invention are the content of metallic and/or alloyed iron, which has an impact on the magnetic and electrical properties, and the silicate content, which has an influence on the apparent density. By varying the amount of silicate and metallic and/or alloyed iron the properties of the base material may be tailored in view of the required properties of the final product.

DETAILED DESCRIPTION OF THE INVENTION

The iron-based starting material is preferably ground magnetite and/or hematite or another iron-containing compound, such as hydrated ferric oxides, such as goethite ore lepidocrocite, or ferric salts. Especially preferred in this respect are highly purified ores such as benificated ores. Instead of ground magnetite and/or hematite ore it is of course also possible to use synthetically prepared magnetite or hematite.

The silica containing starting material is preferably a silicon containing oxide such as silica, but other forms such as intermetallic silica or mixed silicas (containig elements like Mg, Ca, Al, Na) such as Olivine ($(Fe,Mg)_2SiO_4$) or Alumino-silicates such as ($(Na,Al,Si)_2O_6$) could be used as well.

Optionally the starting materials to be mixed may also contain a minor amount of an additive known to improve a magnetic and/or electrical property such as Ni, Sn, P, Co, Al and Mo. Ni, Sn, Co, Al and Mo may be added in metallic or intermetallic form and P may be added as ferrophosphorus.

The starting materials may be subjected to conventional dry blending. According to a preferred embodiment of the invention the starting materials are agglomerated before the reduction.

Agglomeration

A long range of methods to agglomerate powders exist and depending on the requirements in the final application the most suitable method may be selected. An example of a very simple technology is adding a binder (such as PEG) to raw powders followed by mixing whereupon agglomerates may be formed. The mixing procedure and equipment may vary. Specifically the new base material may be prepared by dispersing selected starting materials, the iron-containing powder and the silica-containing material, in a liquid, preferably water, in order to obtain a slurry which is subsequently spray-dried to form agglomerates. Preferably the slurry is an aqueous slurry containing e.g. 0.01–2% by weight of a binding agent, such as polyvinyl alcohol, methyl cellulose and/or carbowax. Irrespectively of the origin of the starting materials, the majority of the particles of this material in the slurry should have an average particle size of less than 25 $\mu$m, preferably less than 15 $\mu$m and most preferably less than 5 $\mu$m. However, if larger particle sizes are desired in the final, reduced and optionally sintered products, the particles of the sintered material should be larger. During the spray-drying spherical agglomerates of the particles of the iron-containing starting material are formed. The size of the spray-dried agglomerates can be controlled and is determined by the conditions during this drying step, such as the composition of the slurry, the flow, the pressure and the type of rotary or spray nozzle used, and is selected by a man skilled in the art in view of the intended use of the final powder. Normally, the agglomerates of the spray-dried powder have an average diameter within the range of from about 10 to 250 $\mu$m.

Reduction

The reduction is preferably performed in a continuous furnace or batch furnace in an atmosphere of hydrogen or hydrogen-containing nitrogen, cracked ammonia or carbon monoxide or combinations thereof. The reduction may also be performed in the presence of carbon containing material. In this context it should be remembered that the temperatures, atmospheres and times for the reduction in combination with the amount of silica in the agglomerates decide the final magnetic properties of the obtained products. More specifically it has been found that increasing reduction temperature results in decreasing saturation magnetisation which likely depends on the fact that less metallic iron is formed. The same is true if the atmosphere for the reduction includes less hydrogen and more inert gas such as nitrogen. Furthermore it is difficult to decide more exactly where the reduction is finished and a sintering begins. Thus it has been found that reduction may be performed up to about 1000° C. at which temperature sintering begins which is observed by a reduction of the specific surface area and increased apparent density of the powder.

In a preferred embodiment of the present method, the spray-dried powder is reduced in a hydrogen based atmosphere at a temperature within the range of from about 450 to 1000° C., preferably from about 500 to 600° C. during a period of about 1 to 4 hours. Furthermore it has been found that maximum content of metallic iron will be obtained when the reduction is performed at temperatures between 500 and 600° C., most preferably between 530 and 570° C. in essentially pure hydrogen.

The time required for the reduction will heavily depend on the type of furnace used, the amount of material in the furnace and the flow of gas etc. For this reason both shorter and longer times might be needed than the 1–4 hours time range indicated above. As an alternative, the spray-dried powder agglomerates are subjected to reduction in a carbon monoxide based atmosphere at a temperature within the range of from about 700 to 1300° C. In yet another embodiment of the reduction, the spray-dried material is subjected to reduction in the presence of carbon-containing material such as graphite at a temperature of from about 1100 to 1300° C., preferably about 1200° C.

According to a preferred embodiment the reduction is performed during such conditions that an agglomerated powder having the following characteristics is obtained.

The powder particle agglomerates consist mainly of a mix of an iron-containing silicate and iron in the form of metallic iron and/or alloyed iron. The term "alloyed iron" refers to metallic iron having other elements dissolved or diffused therein The amount of metallic iron ands/or alloyed iron together with the iron containing silicate constitutes at least 50% by wt of the material.

The amount of iron containing silicate is larger than 0.5 and less than 90%, preferably between 1 and 85% and most preferably between 2 and 80% by weight.

The iron containing silicate essentially consist of (Fe, M)$_x$Si$_y$O$_z$ where Fe/M>0.2, wherein M is selected from the group consisting of Mg, Ca, Al, Na or mixes thereof and 0.5<x<2.5
0.5<y<2
2<z<6

The desired composition of the iron containing silicate is (Fe,M)$_2$SiO$_4$

The microstructure of the agglomerate particles consists basically of compounded** structure comprising a mix of metallic iron and iron containing silicate, silicon oxides and iron oxides and the microstructure may to a minor extent also contain other compounds, alloys and elements formed by the substances therein. The term "compounded" should be interpreted in the way that each powder agglomerate particle consists of a mixture of the different micro constituents.

The apparent density of the obtained powder is preferably between 0.5 and 2.5 g/cm$^3$.

The agglomerate sizes vary from 10 to 250 microns.

The agglomerate particles may have an irregular or spherical shape.

If the reduction is performed until essentially all oxides are finally reduced, the powder according to the present invention consists of mainly metallic iron, alloyed iron and iron containing silicate and at most 3% by weight, preferably less than 2% by weight, of inevitable impurities, such as iron oxides, eg magnetite. The oxygen content of the powder is normally less than 60% by weight, preferably less than 50% by weight.

As mentioned before the process according to the invention starts with agglomeration of a mixture containing very fine iron oxide particles together with a very fine silicon containing material, e.g. silica. Next process step involves a reduction process wherein the iron oxide particles are reduced to metallic iron and at the same time an iron containing silicate is formed. During the process, the iron oxide particles will act as precursors for the iron particles and consequently the iron particles formed will essentially inherit the shape of the iron oxide precursor. The fact that the reduction is performed at elevated temperature where diffusion of atoms takes place at higher speed, means that the iron particles formed will always receive a more rounded shape than iron oxide precursor.

The process parameters for the reduction, such as temperature and time, will to a large extent determine the microstructure in individual powder agglomerates. Thus if e.g. the temperature and or time increase the microstructure will be coarser due to increased diffusion rate. If sufficiently high temperature/long time individual iron particles will start to sinter together forming a 3-dimensional network in each agglomerate.

Also the amount of silicon initially added will determine the tendency for sintering of the iron particles. A rather high content of silicon will make it easier to obtain a powder where each reduced agglomerate contains discrete iron particles in an iron containing silicate matrix. The size of the discrete iron particles obtained will be a natural consequence of the particle size of the oxidic starting material. This means e.g. if a submicron oxide is used, submicron iron particles will be obtained.

Disintegration

Another advantage with the present invention is that the agglomerates obtained after reduction will be easy to disintegrate. This is particularly true when the agglomerates are not too well sintered or do not comprise a too low silicate content. Very low mechanical forces are then needed in order to disintegrate the powder into the individual microconstituents. As very low forces are needed for the disintegration, the mechanical energy stored in the powder (as stresses and defects) will be very low resulting in maintained very low values for remanence and coercivity.

Normally, iron powder being so extremely fine are very reactive and will burn if exposed to air. In this case we have found that the presence of silica and silicate suppresses the oxidation tendency why a very stable fine magnetic powder is obtained. The reactivity of a powder, reduced in essentially pure hydrogen at about e.g. 500–600° C., may be further decreased by subjecting the powder to a temperature of about 700°, preferably above 800° and most preferably above 900° C. Also the fact that extremely low values for remanence and coercivity are obtained can to a significant part be accounted to the presence of the silicon.

The very fine magnetic powder obtained after disintegration will possess a unique set of characteristics which, to the best of our knowledge, are not previously known. After disintegration the powder will have the following characteristics:

The powder mainly contains a mix of discrete metallic iron particles and iron containing silicate particles and to a minor extent iron oxides, silica and other impurities.

The average size of the powder particles range from submicron up to 25 microns. However, as discussed previously, larger particles may also be produced depending on the particle size of the starting material.

The magnetic saturation of the powder ranges from 30 to 220 emu/g.

The remanence of the powder is below 10 emu/g, preferably below 5 emu/g.

The coercivity of the powder is below 60 preferably below 50 Oe and most preferably below 25 Oe.

The resulting iron/iron containing silicate fine powder mix could be further treated, if needed. Thus, a separation step might e.g. be introduced in order to separate the iron containing silicate and metallic iron from each other if wanted. A long range of separation technologies exist using e.g. various chemical processes, magnetic field, centrifugal forces etc, which could be used to separate the phases if needed.

The resulting very fine iron/iron containing silicate powders obtained could be useful in a long range of applications. Especially the powders could be useful for the production of toners or carriers for electrophotography.

The electric properties of the carrier core material are mainly decided by the amount of silicate, the microstructure of the particles and the sintering degree. Increasing amounts of silicate increase the resistivity. It has also been found that a coarse powder which has been well sintered will get a reduced resistivity.

From the foregoing it is obvious that the temperature of the reduction/sintering may vary within wide limits e.g. from about 450 to 1400° C. Preferably the sintering is performed at temperatures above 900° C. preferably above 1000° and most preferably above 1100° C. in an inert or reducing atmosphere in order to obtained a sintered powder. The period of the sintering process depends on the furnace equipment and the desired properties of the final product and can be determined by the man skilled in the art.

Furthermore, as the sintered material mainly consists of metallic iron, which is a conductive material, it is also possible to adjust the resistivity of this material by oxidation treatments which is very important as the machines using the carrier cores are designed for various levels of the resistivity, voltage breakdown and charging properties of the carrier particles.

By oxidation, the conductive behaviour will be changed to more resistive. Depending on how long the oxidation proceeds, the resistivity could be tailored to a desired point ranging from highly conductive to highly resistive. Depending on how the oxidation parameters are chosen, the state and amount of iron oxide formed could be tailored. If the oxidation is performed under sufficiently long time, due to phase transformations (from iron to various iron oxides) also the magnetic saturation of the material might brought down, why a material with not only increased resistivity, but also decreased magnetic saturation could be obtained. This is referred to as deep oxidation. Oxidation will to some extent introduce stresses in individual particles, which could reflected in the magnetic properties i.e. by increased remanence and coercivity. This could easily be adjusted to acceptable levels by an appropriate heat treatment in protective atmosphere in order to relax the stresses.

The conductive behaviour of the material could also be adjusted by surface treatments with various inorganic materials possibly in combination with the surface or deep oxidation described above. The inorganic materials could be added in various ways e.g. as solid particles, through a liquid or a gas.

The state and appearance of the particulate surfaces might also be adjusted by various physical treatments like milling.

Furthermore, the as-reduced particulate material, which has optionally been subjected to an after treatment according to above, might be coated or impregnated with a resinous material. This could be done in many ways, e.g. by dipping the material in a solution of such resinous material in a volatile organic solvent or by spraying the resinous solution over a fluidised bed of the particulate material as known in the art.

In the case of magnetic toner the magnetic powder will be mixed with polymer resin, wax, colour pigments and other additives, kneaded at elevated temperature, cooled and milled to obtain toner particles. Typically the size of toner particles vary between 3 and 15 microns.

A similar process could be used for polymer bonded carriers however the size of carriers are larger, normally between 20 and 200 microns. Particles in this size range can rather easily be obtained by a range of agglomeration technologies.

Depending on the shape and properties wanted a range of different agglomeration technologies, e.g. spray drying followed by hardening, spray cooling of a hot melt or other agglomeration technologies well known to a man skilled in the art could be used.

Other examples of applications of the fine magnetic powder obtained according to the invention include e.g. Metal injection moulding, EMI/Shielding and a long range of chemical applications etc.

The invention is illustrated but not limited to the following examples.

EXAMPLE 1

Magnetite powder having average particle size of about 2 micron together with 5% of silica having average particle size of about 0.5 micron were dispersed in water to give a homogeneous slurry containing 0.4% by weight of polyvinyl alcohol. Then the slurry was spray dried in a spray drier to form spherical agglomerates of 10–150 micron in diameter.

The agglomerates were reduced at about 550° C. in a hydrogen atmosphere for 80 minutes in order to transform the magnetite and silica to essentially a mix of iron and iron-silicon-oxygen compound. The temperature was then raised to 900° C. and held there for 40 minutes in order to reduce the reactivity of the powder. After this the powder was allowed to cool down to room temperature, and after this lightly ground. About the same particle size as that of the starting material was obtained.

The thus prepared powder contained mainly a mix of metalic iron and iron-silicon-oxygen compound and had the following properties (the magnetic measurements were performed with a BH curve tracer from Riken Denshi and the SSA with a BET instrument):

| Saturation magnetization: | 152 emu/g |
|---|---|
| Remanence | 2.0 emu/g |
| Coercivity | 18 Oe |
| Resistivity | $7*10^{10}$ Ohm*cm |
| AD | 1.52 g/cc |
| Flow | 41 sec./50 g |
| SSA | 1204 $m^2$/kg |
| XRD | Mainly Fe & $Fe_2SiO_4$, some FeO and $Fe_3O_4$ |

Chemical Composition (% by Weight):

O-tot=14.9%
Si=3.0
Fe-tot=90.5
Fe-met=82.1

Finally the powder was sintered at 1150° C. for 240 minutes in a hydrogen atmosphere. The thus prepared spherical particles contained mainly a mix of metallic iron and iron-silicon-oxygen compound and had the following properties (the magnetic measurements were performed with a BH curve tracer from Riken Denshi.

| Saturation magnetization: | 200 emu/g |
|---|---|
| Remanence | 0.7 emu/g |
| Coercivity | 6 Oe |
| Resistivity | $2*10^{10}$ Ohm*cm |
| AD | 2.56 g/cc |
| Flow | 25 sec./50 g |
| XRD | Mainly Fe & $Fe_2SiO_4$, some FeO and $Fe_3O_4$ |

Chemical Composition (% by Weight):

O-tot=4.9
Si=3.0
Fe-tot=92.7
Fe-met=92.1

EXAMPLE 2

Magnetite powder having average particle size of about 1.5 micron together with 20% of silica having particle size of about 0.5 micron were dispersed in water to give a homogeneous slurry containing 0.4% by weight of polyvinyl alcohol. Then the slurry was spray dried in a spray drier to form spherical agglomerates of 20–200 micron in diameter.

The agglomerates were reduced at about 550° C. in a hydrogen atmosphere for 80 minutes in order to transform the magnetite and silica to essentially a mix of iron and Iron-Silicon-oxygen compound. The temperature was then raised to 900° C. and held there for 45 minutes in order to reduce the reactivity of the powder. After this the powder was allowed to cool down to room temperature, and after this lightly ground. About the same particle size as that of the starting material was obtained.

The thus prepared powder contained mainly a mix of iron and iron-silicon-oxygen compound, and had the following properties:

| Saturation magnetization: | 89 emu/g |
|---|---|
| Remanence | nm* |
| Coercivity | nm* |
| Resistivity | $>10^{11}$ Ohm*cm |
| AD | 1.09 g/cc |
| Flow | 71 sec./50 g |
| SSA | 1413 $m^2$/kg |
| XRD | Mainly Fe & $Fe_2SiO_4$, some FeO and $Fe_3O_4$ |

*nm not measurable, close to zero

Chemical Composition (% by Weight):

O-tot=35.3%
Si=10.2
Fe-tot=72.5
Fe-met=54.5

Finally the powder was sintered at 1150° C. for 250 minutes in a hydrogen atmosphere. The thus prepared spherical particles contained mainly a mix of iron and iron-silicon-oxygen compound, and had the following properties:

| | |
|---|---|
| Saturation magnetization: | 166 emu/g |
| Remanence | 0.3 emu/g |
| Coercivity | 5 Oe |
| Resistivity | $8*10^9$ Ohm*cm |
| AD | 1.41 g/cc |
| Flow | 73 sec./50 g |
| XRD | Mainly Fe & $Fe_2SiO_4$, some FeO and $Fe_3O_4$ |

Chemical Composition (% by Weight):

O-tot=14.9
Si=10.5
Fe-tot=76.3
Fe-met=74.6

EXAMPLE 3

Magnetite powder having average particle size of about 1.5 micron together with 30% of silica having average particle size of about 0.5 micron were dispersed in water to give a homogeneous slurry containing 0.4% by weight of polyvinyl alcohol. Then the slurry was spray dried in a spray drier to form spherical agglomerates of 20–150 micron in diameter.

The agglomerates were reduced at about 550° C. in a hydrogen atmosphere for 85 minutes in order to transform the magnetite and silica to essentially a mix of iron and Iron-Silicon-oxygen compound. The temperature was then raised to 910° C. and held there for 50 minutes in order to reduce the reactivity of the powder. After this the powder was allowed to cool down to room temperature, and after this lightly ground. About the same particle size as that of the starting material was obtained.

The thus prepared powder contained mainly a mix of iron and iron-silicon-oxygen compound, and had the following properties:

| | |
|---|---|
| Saturation magnetization: | 83 emu/g |
| Remanence | 0.3 emu/g |
| Coercivity | 15 Oe |
| Resistivity | $>10^{11}$ Ohm*cm |
| AD | 1.09 g/cc |
| Flow | 95 sec./50 g |
| SSA | 1069 $m^2/kg$ |
| XRD | Mainly Fe & $Fe_2SiO_4$, some FeO and $Fe_3O_4$ |

Chemical Composition (% by Weight):

O-tot=56.0%
Si=13.0
Fe-tot=62.7
Fe-met=31.0

Finally the powder was sintered at 1150° C. for 230 minutes in a hydrogen atmosphere. The thus prepared spherical particles contained mainly a mix of iron and iron-silicon-oxygen compound, and had the following properties:

| | |
|---|---|
| Saturation magnetization: | 145 emu/g |
| Remanence | 0.5 emu/g |
| Coercivity | 10 Oe |
| Resistivity | $6*10^9$ Ohm*cm |
| AD | 1.60 g/cc |
| Flow | 43 sec./50 g |
| XRD | Mainly Fe & $Fe_2SiO_4$, some FeO and $Fe_3O_4$ |

Chemical Composition (% by Weight):

O-tot=23.2
Si=12.9
Fe-tot=68.8
Fe-met=63.9

EXAMPLE 4

Magnetite powder having average particle size of about 1.25 micron together with 40% of silica having average particle size of about 0.5 micron were dispersed in water to give a homogeneous slurry containing 0.4% by weight of polyvinyl alcohol. Then the slurry was spray dried in a spray drier to form spherical agglomerates of 10–150 micron in diameter.

The agglomerates were reduced at about 555° C. in a hydrogen atmosphere for 80 minutes in order to transform the magnetite and silica to essentially a mix of iron and Iron-Silicon-oxygen compound. The temperature was then raised to 900° C. and held there for 40 minutes in order to reduce the reactivity of the powder. After this the powder was allowed to cool down to room temperature, and after this lightly ground. About the same particle size as that of the starting material was obtained The thus prepared powder contained mainly a mix of iron and iron-silicon-oxygen compound, and had the following properties:

| | |
|---|---|
| Saturation magnetization: | 83 emu/g |
| Remanence | 0.3 emu/g |
| Coercivity | 14 Oe |
| Resistivity | $>10^{11}$ Ohm*cm |
| AD | 0.91 g/cc |
| Flow | 103 sec./50 g |
| SSA | 1682 $m^2/kg$ |
| XRD | Mainly Fe & $Fe_2SiO_4$, some FeO and $Fe_3O_4$ |

Chemical Composition (% by Weight):

O-tot=58.9
Si=19.1
Fe-tot=52.5
Fe-met=22.0

Finally the powder was sintered at 1140° C. for 240 minutes in a hydrogen atmosphere. The thus prepared spherical particles contained mainly a mix of iron and iron-silicon-oxygen compound, and had the following properties:

| | |
|---|---|
| Saturation magnetization: | 109 emu/g |
| Remanence | 0.1 emu/g |
| Coercivity | 2 Oe |
| Resistivity | $6*10^9$ Ohm*cm |
| AD | 1.05 g/cc |
| Flow | 64 sec./50 g |
| XRD | Mainly Fe & $Fe_2SiO_4$, some FeO and $Fe_3O_4$ |

Chemical Composition (% by Weight):

O-tot=28.0
Si=20.5
Fe-tot=55.3
Fe-met=51.5

EXAMPLE 5

Agglomerates were prepared as in the examples 1–4 but the silica content of the starting materials was 60% by weight.

The agglomerates were reduced at about in a furnace including 3 zones having the temperatures 560, 560 and 940 respectively in a hydrogen atmosphere (100% hydrogen) for 130 minutes in order to transform the magnetite and silica to a mix essentially consisting of metallic iron and iron containing silicate.

The thus prepared spherical particles had the following properties:

| | |
|---|---|
| Saturation magnetization: | 42 emu/g |
| Remanence | 0.5 emu/g |
| Coercivity | 30 Oe |
| Resistivity | $7*10^{10}$ Ohm*cm |
| AD | 0.78 g/cc |
| SSA | ($m^2$/kg) average 1738 |
| XRD | Fe and $Fe_2SiO_4/SiO_2$ |

Chemical Composition (% by Weight):

O-tot=40.1
Si=28.9
Fe-tot=36.0
Fe-met=31.0

EXAMPLE 6

Agglomerates were prepared as in example 5 but the silica content of the starting materials was 80% by weight.

The agglomerates were reduced at about 560 for 90 minutes and at about 940 for 45 minutes in a hydrogen atmosphere (100% hydrogen) in order to transform the magnetite and silica to a mix essentially consisting of metallic iron and iron containing silicate.

The thus prepared spherical particles had the following properties:

| | |
|---|---|
| Saturation magnetization: | 31 emu/g |
| Remanence | 0.3 emu/g |
| Coercivity | 60 Oe |
| Resistivity | $>10*10^{11}$ Ohm*cm |
| AD | 0.77 g/cc |
| SSA | ($m^2$/kg) average 2225 |
| XRD | Fe and $Fe_2SiO_4/SiO_2$ |

Chemical Composition (% by Weight):

O-tot=50.8
Si=38.2
Fe-tot=17.1
Fe-met=11

EXAMPLE 7

Magnetite powder having average particle size of about 1.25 micron together with 30% of silica having average particle size of about 0.5 micron were dispersed in water to give a homogeneous slurry containing 0.4% by weight of polyvinyl alcohol. The slurry was spray dried in a spray drier to form spherical agglomerates of 10–150 micron in diameter.

Then the agglomerates were divided into four parts and each part was reduced in a hydrogen atmosphere in a furnace. The agglomerates were subjected to a heat treatment at different temperature profiles (shown in table 1) in the furnace. Each temperature profile included three different temperature zones in the furnace. The agglomerates were transported through the different temperature zones in order to transform the magnetite and silica to essentially a mix of iron and iron-silicon-oxygen compound and to reduce the reactivity of the powder. The total time in the furnace was 130 minutes. After this the powder was allowed to cool down to room temperature.

The thus prepared powders contained mainly a mix of iron and iron-silicon-oxygen compound, and had the properties shown in table 1 below. From the table it can e.g. be seen that the different temperature profiles influence the content of metallic iron, the saturation magnetisation and the specific surface area. The temperature profile #4 represents a preferred embodiment of the invention.

TABLE 1

| | Temp. Profile (° C.) | | | |
|---|---|---|---|---|
| | #1 | #2 | #3 | #4 |
| Zone 1 | 720 | 840 | 940 | 560 |
| Zone 2 | 820 | 840 | 940 | 560 |
| Zone 3 | 940 | 840 | 980 | 940 |
| % $SiO_2$ | 30 | 30 | 30 | 30 |
| Sat. magn. (emu/g) | 65 | 58 | 52 | 83 |
| Remanence (emu/g) | 0.3 | 0.3 | 0.3 | 0.3 |
| Coercivity (Oe) | 15 | 15 | 15 | 15 |
| Resistivity (ohm*cm) | $>10^{11}$ | $>10^{11}$ | $>10^{11}$ | $>10^{11}$ |
| AD (g/cc) | 1.13 | 1.11 | 1.11 | 1.09 |
| Flow (sec./50 g) | 70 | 72 | 69 | 95 |
| SSA ($m^2$/kg) | 1228 | 1218 | 614 | 1069 |
| XRD | Fe and $Fe_2SiO_4$ | Fe and $Fe_2SiO_4$ | Fe and $Fe_2SiO_4$ | Fe and $Fe_2SiO_4$ |
| $O_{tot}$ (% by wt) | 39.3 | 49.5 | 41.1 | 56.0 |
| Si (% by wt) | 34.0 | 33.5 | 34.4 | 13.0 |
| $Fe_{tot}$ (% by wt) | 57.2 | 56.5 | 51.3 | 62.7 |

TABLE 1-continued

|  | Temp. Profile (° C.) | | | |
| --- | --- | --- | --- | --- |
|  | #1 | #2 | #3 | #4 |
| Fe$_{met}$ (% by wt) | 26.7 | 17.0 | 24.5 | 31.0 |

EXAMPLE 8

A reduced powder (submicron magnetite and silica (30%) prepared according to example 3 above was disintegrated by the force of a human hand.

The powder obtained had essentially a submicron particle size and had the following magnetic properties:

Saturation Magnetization=84 emu/g (83)
Remanence=0.4 emu/g (0.3)
Coercivity=13 Oe (14)

(Figures within brackets=properties BEFORE disintegration.)

As can be seen the disintegration will hardly affect remanence and coercivity proving that negligible crystal defects and elastic/plastic energy is introduced to the powder. Thus a unique powder with flexible saturation magnetisation level and maintained very low remanence and coercivity could be obtained)

EXAMPLE 9

A reduced powder (1–3 micron magnetite and submicron silica (5%), prepared according to example 1 above was disintegrated by the force of a human hand.

The powder obtained had essentially a particle size in the range of 1–3 micron and had the following magnetic properties:

Saturation Magnetization=155 emu/g (152)
Remanence=2.7 emu/g (2.0)
Coercivity=24 Oe (18)

EXAMPLE 10

Magnetite powder having average particle size of about 1.25 micron together with 60% of silica having average particle size of about 0.5 micron were dispersed in water to give a homogeneous slurry containing 0.4% by weight of polyvinyl alcohol. Then the slurry was spray dried in a spray drier to form spherical agglomerates of 10–150 micron in diameter.

The agglomerates were reduced at about 555° C. in a hydrogen atmosphere for 80 minutes in order to transform the magnetite and silica to essentially a mix of iron and iron-silicon-oxygen compound. The temperature was then raised to 900° C. and held there for 40 minutes in order to reduce the reactivity of the powder. After this the powder was allowed to cool down to room temperature, and after this lightly ground.

Finally the powder was sintered at 1150° C. for 240 minutes in an atmosphere containing 10% hydrogen and 90% nitrogen. The thus prepared spherical particles contained mainly a mix of iron and iron-silicon-oxygen compound, and had the following properties:

| Saturation magnetization: | 69 emu/g |
| --- | --- |
| Remanence | 0.3 emu/g |
| Coercivity | 20 Oe |
| Resistivity | 2*10$^9$ Ohm*cm |
| AD | 0.95 g/cc |
| Flow | 91 sec./50 g |
| XRD | Fe and Fe$_2$SiO$_4$/SiO$_2$ |

Chemical Composition (% by Weight):

O-tot=40.1
Si=28.9
Fe-tot=36.0
Fe-met=31.0

EXAMPLE 11

Magnetite powder having average particle size of about 1.25 micron together with 80% of silica having average particle size of about 0.5 micron were dispersed in water to give a homogeneous slurry containing 0.4% by weight of polyvinyl alcohol. Then the slurry was spray dried in a spray drier to form spherical agglomerates of 10–150 micron in diameter.

The agglomerates were reduced at about 555° C. in a hydrogen atmosphere for 80 minutes in order to transform the magnetite and silica to essentially a mix of iron and iron-silicon-oxygen compound. The temperature was then raised to 900° C. and held there for 40 minutes in order to reduce the reactivity of the powder. After this the powder was allowed to cool down to room temperature, and after this lightly ground.

Finally the powder was sintered at 1150° C. for 240 minutes in an atmosphere containing 10% hydrogen and 90% nitrogen. The thus prepared spherical particles contained mainly a mix of iron and iron-silicon-oxygen compound, and had the following properties:

| Saturation magnetization: | 31 emu/g |
| --- | --- |
| Remanence | 0.2 emu/g |
| Coercivity | 20 Oe |
| Resistivity | 2*10$^9$ Ohm*cm |
| AD | 1.31 g/cc |
| Flow | 51 sec./50 g |
| XRD | Fe and Fe$_2$SiO$_4$/SiO$_2$ |

Chemical Composition (% by Weight):

O-tot=50.8
Si=38.2
Fe-tot=17.1
Fe-met=11

EXAMPLES 12–19

Magnetite powder having an average particle size of about 1.25 micron together with varying amounts of silica (5%, 20%, 30%, 40%) having an average particle size of about 0.5 micron were dispersed in water to give homogeneous slurries containing 0.4% by weight of polyvinyl alcohol. The slurries were then spray-dried in a spray drier to form spherical agglomerates of 10–150 micron in diameter. The agglomerates were reduced at about 555° C. in a hydrogen atmosphere for 80 minutes in order to transform the magnetite and silica to essentially a mix of iron and iron-silicon-oxygen compound. The temperature was then raised to 900° C. and held there for 40 minutes in order to reduce the reactivity of the different powders. After this the powders were allowed to cool down to room temperature, and after this lightly ground.

Finally the powders were sintered at 1000° C., 1050° C. or 1150° C. for 240 or 300 minutes (see table 1) in an atmosphere containing 10% hydrogen and 90% nitrogen. The thus prepared spherical particles contained mainly a mix of iron and iron-silicon-oxygen compound.

As can be seen from the following table 2 the properties of the obtained powders, when reduced in the same atmosphere, also depend on the time and temperature.

TABLE 2

| Example | 12 | 13 | 14 | 15 | 16 | 17 | 18 | 19 |
|---|---|---|---|---|---|---|---|---|
| Temp./Time | 1150° C./4 h | | | 1050° C./5 h | | | 1000° C./5 h | |
| % $SiO_2$ | 5 | 30 | 5 | 20 | 30 | 40 | 5 | 30 |
| Sat. magn. (emu/g) | 187 | 110 | 149 | 148 | 105 | 91 | 183 | 102 |
| Remanence (emu/g) | 1.2 | 0.4 | 0.6 | 0.7 | 0.6 | 0.3 | 0.7 | 0.3 |
| Coercivity (Oe) | 10 | 12 | 11 | 11 | 13 | 10 | 11 | 10 |
| Resistivity (ohm*cm) | $1 \times 10^3$ | $3 \times 10^{10}$ | $3 \times 10^{10}$ | $1 \times 10^{10}$ | $1 \times 10^{10}$ | $9 \times 10^9$ | $4 \times 10^{10}$ | $>10^{11}$ |
| An (g/cc) | 2.63 | 1.66 | 3.04 | 1.67 | 1.91 | 1.15 | 2.52 | 1.46 |
| Flow (sec./50 g) | 32 | 44 | 22 | 57 | 37 | 60 | 24 | 67 |
| XRD | Mainly Fe and $Fe_2SiO_4/SiO_2$ | | | | | | | |

COMPARATIVE EXAMPLES 20–23

Agglomerates were prepared as in the previous examples with 1, 2, 3 and 5% by wt of $SiO_2$. The agglomerates were however not reduced but sintered in a belt furnace (60 mm/min) at 1030° C. in an atmosphere containing essentially pure nitrogen. The thus prepared particles contained mainly a mix of magnetite, silica and iron-silicon-oxygen and had the following properties:

TABLE 3

| | Example | | | |
|---|---|---|---|---|
| | 20 | 21 | 22 | 23 |
| % $SiO_2$ | 1 | 2 | 3 | 5 |
| Sat. magn. (emu/g) | 90 | 89 | 88 | 85 |
| Remanence (emu/g) | 2.2 | 4.8 | 5.5 | 7.8 |
| Coercivity (Oe) | 19 | 36 | 48 | 67 |
| Resistivity (ohm*cm) | $1 \times 10^8$ | $3 \times 10^8$ | $3 \times 10^8$ | $1 \times 10^8$ |
| AD (g/cc) | 2.50 | 2.22 | 2.15 | 1.97 |
| Flow (sec./50 g) | 26 | 30 | 31 | 39 |

The above results demonstrate that the use of silica for the preparation of electophotographic developers without a reduction step as is disclosed in the Japanese patent publication 63-184764 referred to above does not make it possible to reduce the remanence and coercive force.

What is claimed is:

1. A method for the preparation of a new iron-based powder having magnetic and electric properties and including at least 0.5% by weight of iron containing silicate and at least 10% by weight of metallic iron and/or alloyed iron comprising the steps of:
   mixing an iron containing powder and a silicon containing powder; and
   reducing the obtained mixture at a temperature above about 450° C.

2. A method according to claim 1 wherein the powders are mixed under such conditions that agglomerates are formed.

3. A method according to any one of the claim 2, wherein the agglomerates are disintegrated after the reduction thereof.

4. A method according to claim 1, wherein the powders are sintered after the reduction.

5. A method according to claim 1, wherein the iron-containing powder is selected from the group consisting of iron oxides, hydrated ferric oxides, and ferric salts, and the silicon containing powder is selected from the group consisting of silica, ferrosilicium, and mixed silicates.

6. A method according to claim 5, wherein the silicon containing powder is selected from the group consisting of silica, intermetallic silica, and mixed silica.

7. A method according to claim 1, wherein the silicon containing powder is used in an amount of between 0.5 and 95% by weight of the starting iron powder and silicon containing powder.

8. A method according to claim 1, wherein the starting material in addition to the iron containing powder and the silicon containing powder also Includes one or more powders including one or more of the elements Ni, Sn, P, Co, Al and Mo known to be effective for improving the soft magnetic properties.

9. A method according to claim 1, wherein the reduction is performed in a hydrogen-based atmosphere, in a carbon monoxide atmosphere, in a cracked ammonia atmosphere, in the presence of graphite or combinations thereof.

10. A method according to claim 9, wherein the reduction is performed in essentially pure hydrogen at a temperature between about between 500 and 600° C.

11. A method according to claim 10, wherein, after or in connection with the reduction, the powder is subjected to a temperature above 600° C. in an inert or reducing atmosphere in order to reduce the reactivity.

12. A method according to claim 4, wherein the reduced powder is sintered at a temperature above 900° C.

13. A method according to claim 2, wherein the agglomerates are formed by dispersing the iron containing powder and the silicon containing powder in a liquid in order to obtain a slurry and spray-drying the obtained slurry to form aggregates.

14. A method according to claim 1, wherein the silicon containing powder is used in an amount of between 1 and 90% by weight of the starting iron powder and silicon containing powder.

15. A method according to claim 1, wherein the silicon containing powder is used in an amount of between 2 and 85% by weight of the starting iron powder and silicon containing powder.

16. A method according to claim 10 wherein, after or in connection with the reduction, the powder is subjected to a temperature above 700° C. in an inert or reducing atmosphere in order to reduce the reactivity.

17. A method according to claim 10 wherein, after or in connection wit the reduction, the powder is subjected to a temperature above 800° C. in an inert or reducing atmosphere in order to reduce the reactivity.

18. A method according to claim 4, wherein the reduced powder is sintered at a temperature above 1000° C.

19. A method according to claim 4, wherein the reduced powder is sintered at a temperature above 1000° C.

20. A method according to claim 2, wherein agglomerates are sintered after the reduction.

21. A method according to claim 5 wherein said iron oxide of said iron-containing powder is selected from the group consisting of magnetite, hematite, synthetically prepared magnetite, synthetically prepared hematite, and mixtures thereof.

22. A method according to claim 5 wherein said hydrated ferric oxide of said iron-containing powder is selected from the group consisting of geothite and lepidocrocite.

23. A method according to claim 5 wherein said mixed silicate of said silicon containing powder includes elements selected from the group consisting of Mg, Ca, Al, Na, and mixtures thereof.

24. A method according to claim 5 wherein said mixed silicate of said silicon containing compound is olivine (Fe, Mg)$_2$SiO$_4$.

25. A method according to claim 5 wherein said mixed silicate of said silicon containing compound is an alumino-silicate.

26. A method according to claim 25 wherein said alumino-silicate of said silicon containing powder is (Na, Al,Si)$_2$O$_6$.

27. A powder having magnetic and electric properties comprising a mix of at least 0.5% by weight of an iron-containing silicate and at least 10% by weight of iron in the form of metallic iron and/or alloyed iron.

28. Powder according to claim 27, wherein the amount of metallic iron, alloyed iron and/or iron containing silicate constitutes at least 50% by weight of the material.

29. Powder according to claim 27, wherein the iron containing silicate essentially consists of (Fe, M)$_x$Si$_y$O$_z$ where Fe/M>0.2, wherein M is selected from the group consisting of Mg, Ca, Al, Na or mixtures thereof, and 1.5<x<2.5, 0.5<y<2, and 2<z<6.

30. Powder according to claim 27, wherein the composition of the iron containing silicate is (Fe,M)$_2$SiO$_4$.

31. Powder according to claim 27, wherein the powder particles are distinguished by a saturation magnetisation less than 220 emu/g, a remanence a, less than 5 emu/g, and a coercivity H$_C$ less than 60 Oe.

32. Powder according to claim 27, the average particle size being less than 25 micron.

33. Powder according to claim/wherein the iron containing silicate essentially consists of (Fe, M)$_x$Si$_y$O$_z$ where Fe/M>0.2, wherein M is selected from the group consisting of Mg, Ca, Al, Na or mixes thereof, and 1.5<x<2.5, 0.5<y<2, and 2<z<6.

34. Powder according to claim 27, wherein the powder particles are distinguished by a saturation magnetisation less than 220 emu/g, a remanence σ$_r$ less than 3 emu/g, and a coercivity H$_C$, less than 50 Oe.

35. Powder according to claim 27, wherein the powder particles are distinguished by a saturation magnetisation less than 220 emu/g, a remanence σ$_r$ less than 3 emu/g, and a coercivity H$_C$, less than 25 Oe.

* * * * *